United States Patent
Sadhvani et al.

(10) Patent No.: US 9,286,252 B2
(45) Date of Patent: Mar. 15, 2016

(54) OFF-NETWORK CONTENT SHARING FOR NEAR FIELD COMMUNICATION DEVICES

(71) Applicant: Cellco Partnership, Arlington, VA (US)

(72) Inventors: Rita Sadhvani, Watchung, NJ (US); Brigitte Bastaldo-Tsampalis, Bridgewater, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 26 days.

(21) Appl. No.: 14/176,637

(22) Filed: Feb. 10, 2014

(65) Prior Publication Data
US 2015/0227478 A1   Aug. 13, 2015

(51) Int. Cl.
*G06F 3/00*       (2006.01)
*G06Q 10/00*    (2012.01)
*G06Q 30/00*    (2012.01)
*G06F 13/28*    (2006.01)

(52) U.S. Cl.
CPC ............... *G06F 13/28* (2013.01); *G06Q 10/00* (2013.01)

(58) Field of Classification Search
None
See application file for complete search history.

(56) References Cited

U.S. PATENT DOCUMENTS

2013/0254028 A1* 9/2013 Salci ..................... G06Q 20/12 705/14.53
2015/0100441 A1* 4/2015 Alarcon et al. ................. 705/16

OTHER PUBLICATIONS

GSMA White Paper:Mobile Commerce in Retail:Loyalty and Couponing, Jan. 2014, all pages (1-38).*

* cited by examiner

*Primary Examiner* — David E Martinez (57) ABSTRACT

An exemplary system and method enables direct transfers of content between devices to be evaluated by service providers in support of marketing services and the like to those devices (and their users). The system and method utilizes cards and records during the direct transfers to capture user activity information and then provides those cards and records to the service providers. Thus, even though the direct transfer is off-network or outside of the service provider system, the use of cards and records by the system and method provides the user activity information to the service provider for enhancing marketing services.

18 Claims, 6 Drawing Sheets

Exemplary Scheme 100

OFF-NETWORK CONTENT SHARING FOR NEAR FIELD COMMUNICATION DEVICES

BACKGROUND

Devices may share content via content transfers. Content transfers may include system transfers and direct transfers. A system transfer leverages a service provider system to communicate, store, and access content between devices. In return, the service provider may evaluate characteristics of each system transfer to provide and support marketing services and the like to the devices (and their users). Examples of system transfers may include email transfers, multimedia messaging transfers, cloud storage transfers, and/or other peer-to-network-to-peer transfers.

In contrast, a direct transfer does not leverage the service provider system to transfer content. Rather, direct transfers share content outside of the service provider system by leveraging communication technologies local to the devices. Examples of direct transfers using local communication technologies may include near field communication (NFC) transfers, Bluetooth® transfers, and/or other peer-to-peer or off-network transfers of content.

Further, since direct transfers are outside of the service provider system, characteristics of the direct transfers are unavailable to service providers. These characteristics, if known by the service provider, would be extremely valuable for enhancing marketing services. Thus, it would be prudent to provide a system and method that enables, records, and analyzes peer-to-peer level transfers (e.g., direct transfers) so that the service provider may access the characteristics of the direct transfers.

DETAILED DESCRIPTION

A system and method provides enabling, recording, and analyzing direct transfers of content between devices to provide and support marketing services and the like to the devices (and their users). The system and method utilizes cards that identify users and their preferences to generate records that store characteristics of direct transfers. These records are then accumulated within the service provider system and analyzed for user activity information. The user activity information is the basis for marketing services, generating recommendations, etc. Thus, even though the direct transfer is off-network or outside of the service provider system, the use of cards and records by the system and method provides key characteristics of the direct transfer to the service provider for enhancing marketing services.

Figure 1:
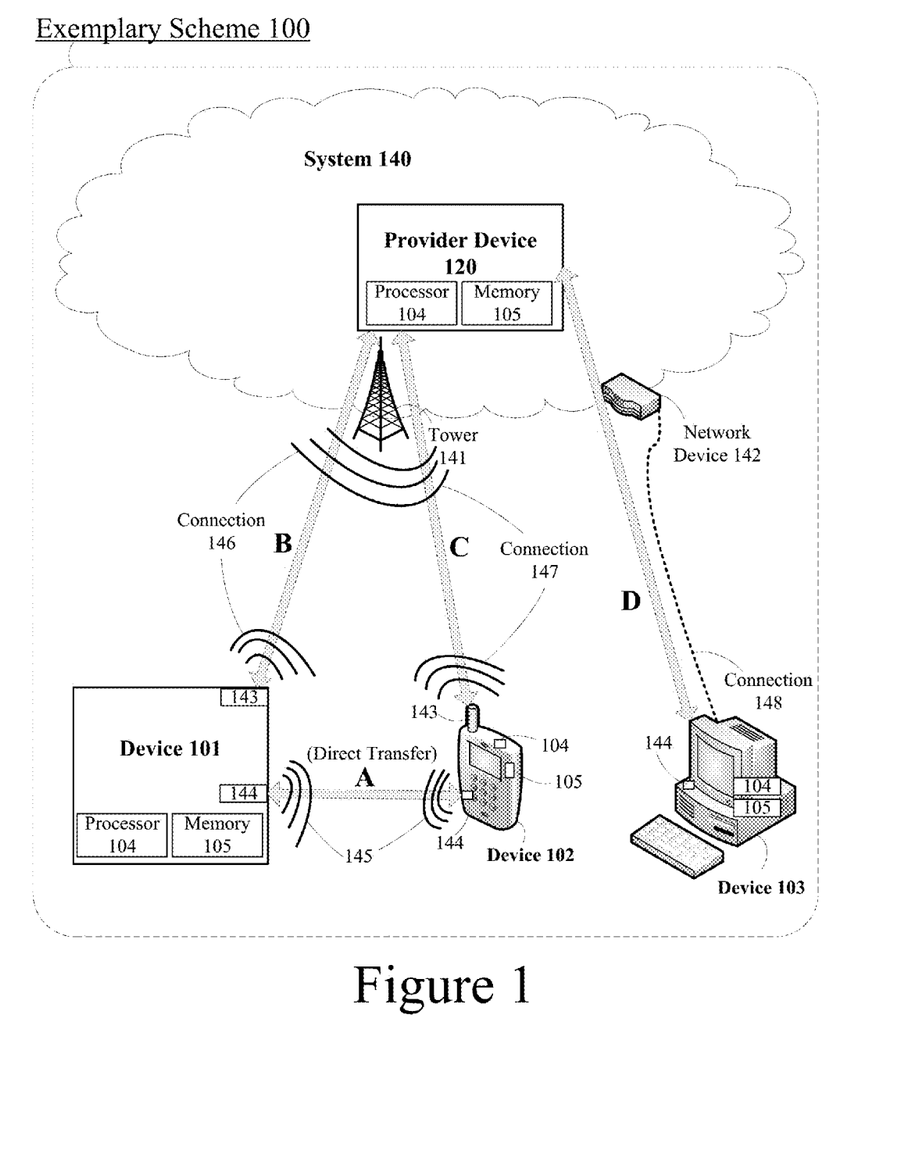
FIG. 1 illustrates an scheme in which devices operate.

FIG. 1 illustrates a scheme 100 having devices 101-103 (e.g., user devices), which include processors 104 and memories 105, that perform a direct transfer via a local communication technology (e.g., direct transfer A). Further, FIG. 1 illustrates a provider device 120, which also includes a processor 104 and a memory 105, within a system 140 that communicates (e.g., arrows B-D) with devices 101-103 to access and/or receive records of the direct transfer A and to provide marketing services.

For example, a first device 101 may perform a direct transfer A of content, such as a coupon, to a second device 102 via NFC such that a seamless transfer of content is perceived by users. That is, a first user associated with the first device 101 may choose content within the first device 101, tap the second device 102 with the first device 101, and observe the seamless transfer of the coupon to the second device 102. In operation, the device 101 initiates a transaction application that loads a first card, which digitally represents a first user account and includes configurable settings and preferences, and generates an interface for display on the first device 101 that enables a user to select the coupon. Thus, when the user interface receives an input that selects the coupon and designates the coupon for direct transfer from the user, the transaction application packages the coupon for direct transfer after confirming that the preferences of the first card permit transmission of the coupon (e.g., when the first card preferences indicate that the coupon or the user or the combination stops transfer as further described below). Next, when the first user taps (whether by physical contact or moving within a predefined proximity, such as 3 feet) the second device 102 with the first device 101, the transaction application electronically presents the coupon via NFC. In turn, the second device 102 automatically loads a second card, which digitally represents a second user associated with the second device 102 and includes configurable settings and preferences, and confirms whether those preferences permit the receipt of the coupon presented by the first device 101. When receipt is permitted by the second card, an NFC Share operation that transfers the coupon from the first device to the second device is performed.

Further, each device 101, 102 generates and stores a record in its respective memory 105 that includes at least a subset of characteristics of the direct transfer that are particular to that device's side of the transaction. Characteristics may include a coupon type, user information for each device 101, 102, sender information, and receiver information, transfer information, etc. Coupon types may be based on shopping categories, such as electronics, home and garden, sports and outdoors, clothing, toys, books, music, movies, health and beauty, automotive, industrial, etc. User information may be user identification information, such as a user identification number, a user account number, gender, age, height, weight, marital status, financial information, billing information, personalized information etc. Sender and receiver information may be the technical attributes of the devices, such as make, model, age, media access control address, identify of sender, identify of receiver, etc. Transfer information may be the technical attributes of the transfer, such as time stamp or time of transfer information, duration of transfer, amount of data transferred, errors during transfer, location information, security information, distance between devices during transfer, technology of transfer, etc. The subset of characteristics of any record may be predetermined from the examples above by any of the devices 101, 102, 103, 120 or the user.

Next, the provider device 120 accesses or receives the records through automatic or user initiated communications (e.g., arrows B-D) and evaluates each record separately such that a particular set of marketing services may be provided to each device 101, 102 (e.g., the marketing services may be tailored to the user of a specific device that engaged in a direct (non-provider/network based) transaction based on the user's direct transfer activity). For instance, since the first device 101 gave the coupon away, the provider device 120 may notate that the first user no longer desires coupons of that type and will thus refrain from forwarding similar coupons to the first device 101. Similarly, since the second device 102 received the coupon, the provider device 120 may notate that the second user desires coupons of that type and will thus forward similar coupons to the second device 102.

The items of the scheme 100 will now be further described. The scheme 100 includes the devices 101-103 and the provider device 120, that may be any computing system and/or device that includes a processor and a memory (e.g. 104 and 105, respectively). Computing systems and/or devices generally include computer-executable instructions, where the instructions may be executable by one or more devices such as those listed below. Computer-executable instructions may be compiled or interpreted from computer programs created using a variety of programming languages and/or technologies, including, without limitation, and either alone or in combination, Java™, C, C++, Visual Basic, Java Script, Perl, etc. The scheme 100 and items therein (e.g., devices 101-103 and provider device 120) may take many different forms and include multiple and/or alternate components and facilities, as illustrated in the Figures further described below. While exemplary systems, devices, modules, and sub-modules are shown in the Figures, the exemplary components illustrated in the Figures are not intended to be limiting. Indeed, additional or alternative components and/or implementations may be used, and thus the above communication operation examples should not be construed as limiting.

In general, computing systems and/or devices (e.g., devices 101-103 and provider device 120) may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif., the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing systems and/or devices include, without limitation, cell phones (e.g., the device 102), smart-phones, super-phones, tablet computers, next generation portable devices, mobile printers, handheld computers, secure voice communication equipment, networking hardware, or some other computing system and/or device. Alternatively, computing systems and/or devices may also be a computer workstation, a server, a desktop (e.g., the device 103), a notebook, or a laptop.

Further, the processor or the microprocessor (e.g., processors 104) of computing systems and/or devices receives instructions from the memory (e.g., memories 105) and executes these instructions, thereby performing one or more processes, including one or more of the processes described herein. Such instructions and other data may be stored and transmitted using a variety of computer-readable mediums (e.g., memory 105).

A processor 104 may include processes comprised from any hardware, software, or combination of hardware or software that carries out instructions of a computer programs by performing logical and arithmetical calculations, such as adding or subtracting two or more numbers, comparing numbers, or jumping to a different part of the instructions. For example, the processor 104 may be any one of, but not limited to single, dual, triple, or quad core processors (on one single chip), graphics processing units, visual processing units, and virtual processors.

A memory 105 may be, in general, any computer-readable medium (also referred to as a processor-readable medium) that may include any non-transitory (e.g., tangible) medium that participates in providing data (e.g., instructions) that may be read by a computer (e.g., by processors 104 of the devices 101-103 and provider device 120). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including radio waves, metal wire, fiber optics, and the like, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, the elements of the devices 101-103 and the provider device 120 may be implemented as computer-readable instructions (e.g., software) on one or more devices (e.g., servers, personal computers, etc.), stored on computer readable media associated therewith (e.g., disks, memories, etc.). A computer program product may comprise such instructions stored on computer readable media for carrying out the operations described herein.

The devices 101-103 may generally be any electronic hardware that includes a processor 104 and a memory 105 and is capable of sharing content via content transfers, such as direct transfers A outside of the system 140 or off-network transmissions that utilize communication technologies local to the devices 101-103.

Examples of devices 101-103 may include, without limitation, desktops, notebooks, laptops, phones, tablets, computer workstations, next generation portable devices, handheld computers, or some other computing system and/or device. Examples of content may be include, without limitation, apps, music, video, pictures, voice memos, documents, contacts, coupons, gift cards, and the like. Examples of communication technologies local to the devices 101-103 may include, without limitation, any wired or wireless communication technology, such as near field communication (NFC), Bluetooth®, Wi-Fi, and similar radio technologies that exchange electronic data by converting propagating electromagnetic waves to and from conducted electrical signals, as further described below with reference to transceivers 144 and connection 145.

The devices 101-103 may further include a display, support user interfaces, and/or communicate within the scheme 100. A display is an output device for presentation of information in visual or tactile form, such as user interfaces or web portals. Examples of display may include, without limitation, cathode ray tube display, light-emitting diode display, electroluminescent display, electronic paper, plasma display panel, liquid crystal display, high-performance addressing display, thin-film transistor display, organic light-emitting diode display, surface-conduction electron-emitter display, laser TV, carbon nanotubes, quantum dot display, interferometric modulator display, and the like. Thus, a display of any device 101-103 may present user interfaces or a web portal to a user, such that the user may interact with and receive information from other devices 101-103 or the provider device 120.

The devices 101-103 may also include a location determination technology that enables the determination of a current geographic position. Examples of location determination technology may include, without limitation, global positioning systems, indoor positioning system, local positioning system, and mobile phone tracking.

The devices 101-103 may further utilize the processor 104 to operate a transaction application (e.g., transaction application 210 of FIG. 2 described below) to generate user interfaces on the display, execute and process content transfers, and generate records (e.g., records 221 of FIG. 2 described below) memorializing the content transfers.

The provider device 120 may also be any hardware that includes a processor 104 and a memory 105 and manages the records memorializing the content transfers. The provider device 120 may further utilize the processor 104 to operate a transaction application (e.g., transaction application 210 of FIG. 2 described below) to access, receive, and evaluate records (e.g., records 221 of FIG. 2 described below) in support of marketing services. In addition, the provider device 120 may operate the transaction application to directly evaluate at least a subset of the characteristics associated with the content transfers in support of marketing services.

Further, the provider device 120 may be a server. In general, a server may be any computing system and/or device (as described above) acting as databases, data repositories or other data stores that include any type of data source and/or file system that manages the records memorializing the content transfers. For instance, data sources may include a data management client, along with licenses (e.g., a license that permits control and access of record store by the devices 101-103) relating to data management access and/or configurations. Thus, the device management client may include executable instructions that manage the communications (e.g., arrows B-D) with devices 101-103 by setting configurations and diagnostics based on a particular protocol.

Figure 5:
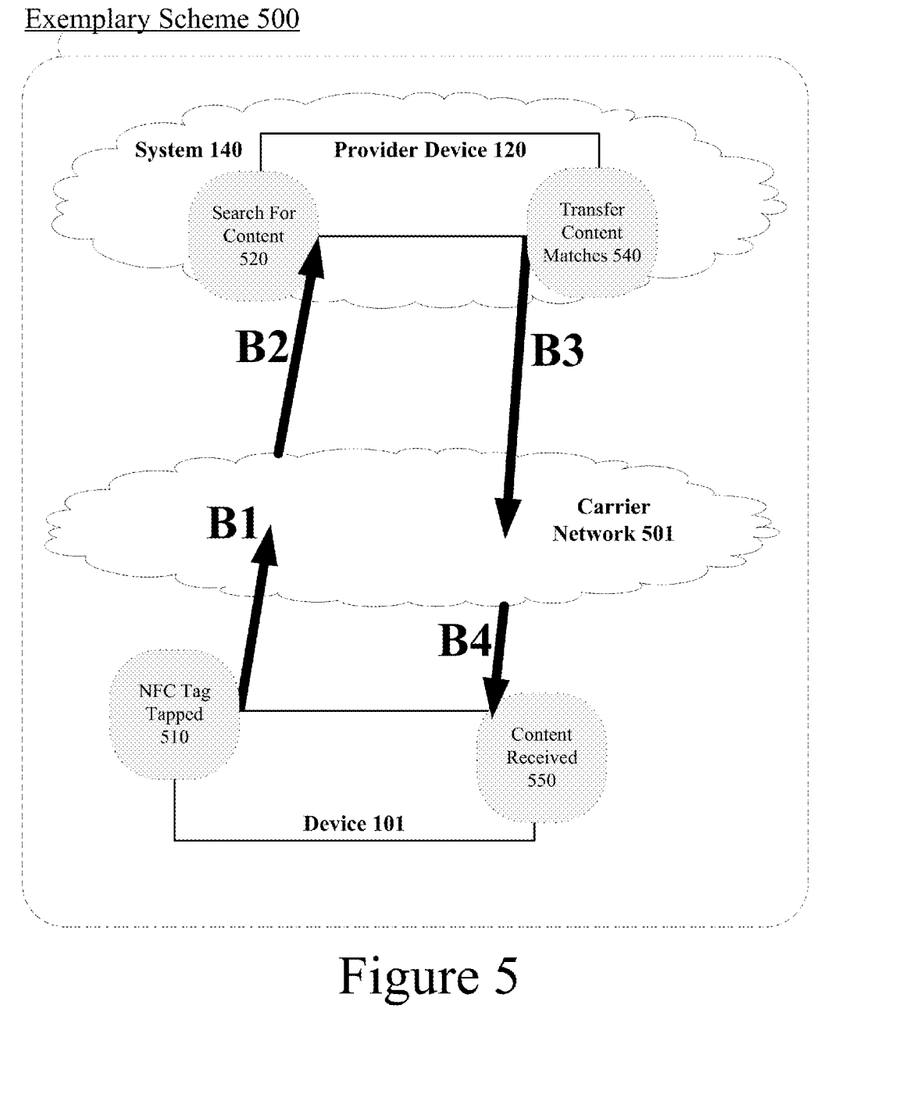
FIG. 5 illustrates an NFC Tap operation.

Further, databases, data repositories or other data stores (e.g., the database 220) described herein may generally include various kinds of mechanisms for storing, providing, accessing, and retrieving various kinds of data, including a hierarchical database, a set of files in a file system, an application database in a proprietary format, a relational database management system (RDBMS), etc. Each such data store may generally be included within or external to a computing system and/or device (e.g., devices 101-103 and provider device 120) employing a computer operating system such as one of those mentioned above, and/or accessed via a network (e.g., system 140 or carrier network 501) or connection in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

The scheme 100 illustrates exemplary infrastructure components, along with the system 140, that support communication operations between the devices 101-103 and the provider device 120. The exemplary infrastructure components may include a tower 141, a network device 142, transceivers 143, 144, and connections 145-148.

A system 140 may be a network that provides the infrastructure through which the devices 101-103 and the provider device 120 communicate. In general, a network (e.g., system 140 or carrier network 501) may be a collection of computers and other hardware to provide infrastructure to establish virtual connections and carry communications. For instance, a network may be an infrastructure that generally includes edge, distribution, and core devices (e.g., tower 141 or network devices 142) and enables a path (e.g., connections 146, 147, 148) for the exchange of information between different devices and systems (e.g., between devices 101-103 and provider device 120). Further, a network may be any conventional networking technology, and may, in general, be any packet network (e.g., any of a cellular network, global area network, wireless local area networks, wide area networks, local area networks, or combinations thereof, but may not be limited thereto) that provides the protocol infrastructure to carry communications. The system 140 is representative, and thus while a single cloud illustrates the system 140, this illustration may represent a single network, a combination of different networks components and technologies, and/or a plurality of networks, as described above.

The towers 141 may be tall structures designed to support antennas or aerials for telecommunications amongst the scheme 100. The tower 141 may enable the connections 146, 147 that complete communication paths that carry signals to and/or from the system 140. For instance, the connection 146 completes a communication path from the system 140 via the tower 141 to the transceiver 143 of the device 101 (e.g., arrow B). Further, the connection 147 completes a communication path from the system 140 via the tower 141 to the transceiver 143 of the device 102 (e.g., arrow C) and the connection 148 completes a communication path from the system 140 via the network device 142 to the device 103 (e.g., arrow D).

The network device 142 may be any computing system and/or device as described above that is a gateway between connection 148 and the system 140 to complete a communication path between the device 102 and the provider device 120 of the system 140. Additional examples of computing systems and/or devices with respect to the network device 142 include, without limitation, networking hardware such as gateways, routers, network bridges, switches, hubs, repeaters, multilayer switches, protocol converters, bridge routers, proxy servers, firewalls, network address translators, multiplexers, network interface controllers, wireless network interface controllers, modems, ISDN terminal adapters, line drivers, wireless access points, networking cables and the like.

The transceivers 143, 144, may be any connector used for digital or analog signal transfers. For instance, the transceivers 143 may be any antenna technology, such as cellular, Wi-Fi, or the like, that implements a wireless exchange of data by converting propagating electromagnetic waves to and from conducted electrical signals. Further, the transceivers 144 may be an antenna technology that implements Wi-Fi, near field communication, Bluetooth®, or the like, which is used to exchange data wirelessly using radio waves over a radio range or network that enables direct communication. For instance, transceiver 144 may be an NFC chip prepared and utilized by the NFC operations described below to perform a direct transfer of content (e.g., direct transfer A).

The connections 145-148 may be wired or wireless connections between two endpoints (devices or systems) that carry electrical signals that facilitate virtual connections. Examples of connections 145-148 may be any transmission media including radio waves, metal wire, fiber optics, and the like. Virtual connections are comprised of the protocol infrastructure that enables communication (e.g., arrows A-D) to and from devices 101-103 and the provider device 120. For instance, connection 145 may be a wireless connection (e.g., NFC) using radio waves over a radio range or network between the transceivers 144 of the devices 101 and 102;

connections 146 and 147 may be wireless connections between the tower 141 and the transceivers 143 of the devices 101 and 102; and connection 148 may be a wired connection between the device 103 and network device 142. Further, the combination of connections 145-148 support the virtual connections of the scheme 100, and therefore, any device 101-103, 120 may communicate with another device 101-103, 120 based on a need of the scheme 100 to perform a direct transfer of content.

Figure 2:
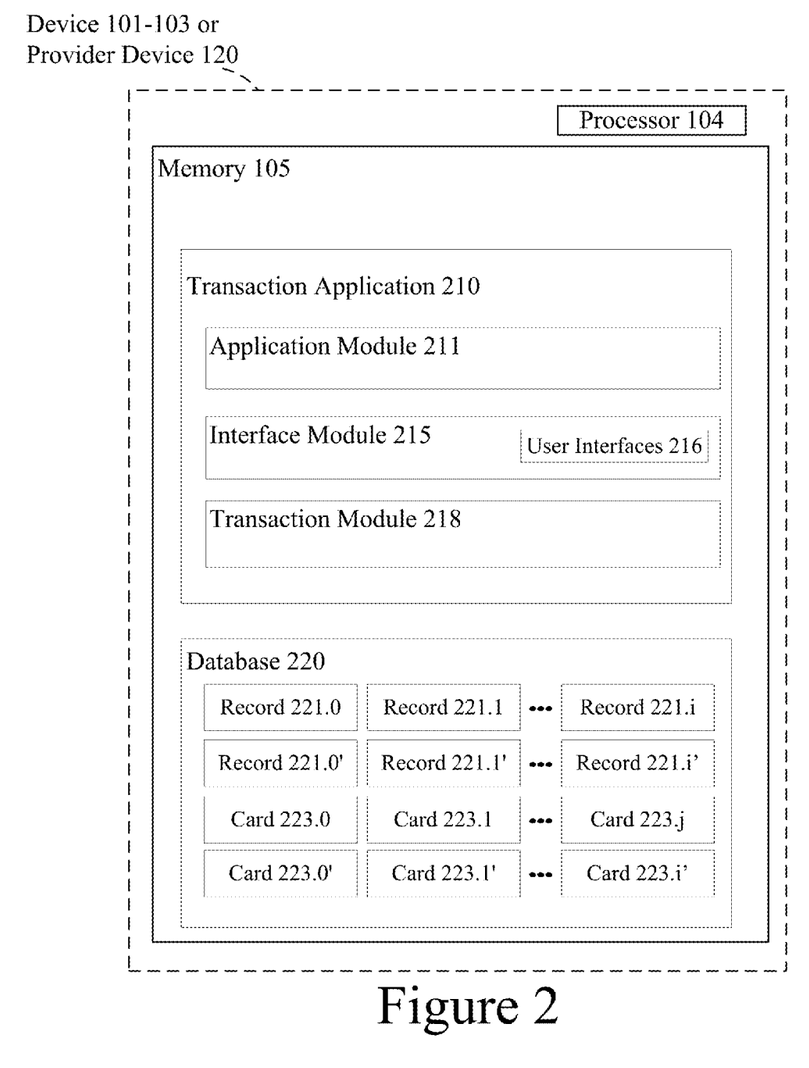
FIG. 2 illustrates an exemplary schematic of a transaction application.

The transaction application will now be described with reference to the exemplary schematic of FIG. 2 (note that items that have been previously discussed may be utilized to denote the same or similar items in subsequent Figures). FIG. 2 illustrates a transaction application 210 and a database 220 stored on a memory 105 of a device 101, 102,103 or provider device 120 (as illustrated by the dashed-box). The transaction application 210 includes an application module 211, an interface module 215 that generates user interfaces 216, and a transaction module 218. Further, the database 220 may store and manage records, such as records 221 and cards 223.

Although one modular breakdown of the transaction application 210 is offered, it should be understood that the same functionality may be provided using fewer, greater, or differently named modules. Further, although it is not shown, the interface module 215 and the application module 211 may be integrated with any of the above named modules. Also, a single device may be independently configured to include the entire operability of the transaction application 210, as illustrated in FIG. 2. As another example, the operability of the transaction application 210 may be divided between the devices 101-103 and the provider device 120, where modules 211, 215, 218 may be located separately on different devices and accessed through connections 145-148 and/or distributed computing, such that the operability is provided for, shared, and relied upon by other devices.

The transaction application 210 may generally be operated by the device 101-103 and/or provider device 120. The transaction application 210 may include configurable settings, which may be associated with the transaction application 210, stored within the memory 105, and/or stored in cards 223 as defined below. The configurable settings may further govern direct transfers by managing consent requirements from the user of the transaction application 210. Consent may be acquired by leveraging user interfaces 216, as described below, to facilitate notifications to the user and receive user inputs indicating consent in response to the notifications.

Examples of the transaction application 210 being operated by the devices 101-103 include a dedicated application for managing content transfers of content in a dedicated folder (e.g., database 220) or an existing application that leverages other software of the device 101 to enable content transfers. In either case, direct transfers are memorialized in records 221 by the transaction application 210 for later use by the provider device 120. For instance, the transaction application 210 of the device 101 may utilize the application and transaction modules 211, 218 in conjunction to perform content transfers with another device (e.g., device 102) based on an input received via the user interfaces 216 of the interface module 215. For instance, the transaction application 210 may then perform the content transfers, such as system transfers that leverage the system 140 for peer-to-network-to-peer transfers and direct transfers that leverage transceivers 144 to communicate, store, and access content (e.g., peer-to-peer or off-network transmissions of content). The transaction application 210 of the device 101 may then generate the records 221 of the database 220 to store characteristics of the content transfer.

Examples of the transaction application 210 being operated by the provider device 120 include a dedicated application for evaluating records 221 accessed or received from the devices 101-103 or an existing application that leverages other software of the provider device 120 to enable evaluations of records 221. That is, the transaction application 210 of the provider device 120 may access or retrieve those same records 221 to accumulate characteristics. The transaction application 210 of the provider device 120 may further evaluate the accumulated characteristics to assess each user's activities with respect to the content transfers. Based on the assessment, the transaction application 210 of the provider device 120 may provide services to the devices 101-103 and/or users of those devices, such as providing marketing services, generating recommendations, forwarding materials, etc.

The application module 211 may be any application programmable interface or application binary interface that includes a set of executable instructions configured to facilitate communication between the modules of the transaction application 210 and hardware/software components external to the transaction application 210, including the devices 101-103 and the provider device 120. Examples application programmable and application binary interfaces include POSIX, Microsoft Windows API, Java API, Linux Standard Base, and the like. That is, the application module 211 may be configured to communicate directly with other applications, modules, models, devices, systems, and other sources through both physical and virtual interfaces. Further, the application module 211 may include executable instructions and specifications for routines, data structures, object classes, and variables that receive, package, present, and transfer content through a connection 145 or through a system 140, as further described below. For example, the application module 211 may be configured to receive instructions from the interface module 215 or sources external to the device 101 and, based on those instructions, forward the instructions to the transaction module 218. The application module 211 may also manage the dispatching and receipt of records 221 and/or cards 223 along with integrating the transaction application 210 with other applications and drivers, as needed per operating system.

The interface module 215 may be an application programmable interface that includes a set of executable instructions for generating and managing user interfaces 216, which receive inputs that may authorize content transfers to and from the transaction application 210 and update cards 223 that govern content transfers. For instance, the interface module 215 may be configured to generate, present, and provide one or more user interfaces 216 (e.g., in a menu, icon, tabular, map, pop-up, or grid format) in connection with other modules for presenting information and receiving inputs (e.g., indications of acceptance, deference, or rejection of the content transfers and/or configuration adjustments altering, updating, or changing the user preferences on the cards 223). The inputs received by the user interfaces 216 may generally be communicated by interface module 215 to the application module 211, which in turn forwards the inputs to the transaction module 218 for processing.

The user interfaces 216 may include any presentation of information or data through a display, whether graphic or otherwise, where interaction between a user and the transaction application 210 occurs. Examples of user interfaces 216 may include the data manipulation interfaces, graphical user interface (that allows users to interact with electronic devices through graphical icons and visual indicators), touchscreen interfaces, text-based interfaces, typed command labels or text navigation. The user interfaces may receive inputs indicating the user selections (e.g., single or multiple instances of content), configurations, and/or consent regarding content transfers. The user interfaces 216 may further include notifications such as banners, icons, badges, alerts, sounds, text, or any combinations thereof. A banner may be a media or dropdown menu that extends from a top portion of an interface, a sub-interface, and/or display of a device 101, 102, 103 and that may include text, badges, and animated symbols. An icon and/or a badge may be a number or symbol that signals a link, an event, or a number of events. An alert may be a pop-up window that may be centered on the display and that may include text, badges, and animated symbols.

The interface module 215 may further generate new and unique interfaces particular to the transaction application 210. The interface module 215 may also commandeer or utilize interface formatting local to the device in which the transaction application 210 is stored thereon (e.g., appropriating interfaces of the device 101, 102, 103 or web portal interfaces for providing notifications and receiving inputs). The interface module 215 may thus generate or utilize local, terminal, web-based, and mobile interfaces and any similar interface that presents and receives information relative to the devices 101-103 and the provider device 120.

The transaction module 218 may be an application programmable interface that includes a set of executable instructions configured to process content transfers. That is, the transaction module 218 may process system transfers by leveraging the system 140 and direct transfers outside of the system 140 to share content between the devices 101-103 and the provider device 120. To process content transfers, the transaction module 218 may also implement a heuristic that may self-regulate, initiate, permit and/or filter the content transfers to and from the devices 101-103 and the provider device 120 based on a card 223 (or a corresponding card 223' as described below). Examples of implementing the heuristic based on the card 223 may include initiating an NFC task operation, initiating direct transfers via an NFC Share operation, initiating an NFC Tap operation, authenticating content transfers sent or received by NFC Share or Tap operations, and updating (e.g., periodically or otherwise) the card 223 locally and/or the corresponding card 223' remotely.

The NFC task operation is a sequence that prepares the transaction application 210, the selected content, and hardware (e.g., the transceiver 144) for a direct transfer. The NFC Share operation is a sharing of selected content via hardware that was prepared during the NFC task operation. The NFC Share operation may generally be a bidirectional NFC connection (e.g., direct transfer A) that includes two NFC chips (e.g., transceivers 144) on two separate devices (e.g., devices 101-102). The NFC Tap operation is a one direction interaction of detecting an NFC tag that triggers an updating of the card 223 (or the corresponding card 223') based on information associated with the NFC tag. NFC tags are a version of an application of radio frequency technology that are programmed before use with information regarding sharing content. Similarly, to the NFC Share operation, the NFC Tap operation is performed via hardware, such as an NFC chip (e.g., transceiver 144), that was prepared during the NFC task operation.

The transaction module 218 may work in conjunction with the interface module 215 to enable the device 101 to receive inputs that alter the cards 223 governing content transfers. Subsequently, the transaction module 218 may receive inputs that indicate a selection of content and consent to perform a direct transfer the selected content. Then, the transaction module 218 may utilize the heuristic of the transaction application 210 to access the configuration settings and self-regulate the direct transfer according to the cards 223. In turn, the transaction application 210 may work in conjunction with the application modules 211 to enable the device 101 to communicate (e.g., direct transfer A) with the device 102 via a connection 145 to perform the direct transfer of the selected content.

The transaction module 218 may further work in conjunction with the application module 211 and database 220 to store a record 221 and/or card 223 that includes characteristics of the direct transfer of the selected content. For instance, when the transaction module 218 is on the provider device 120, the transaction module 218 may access or receive (via communications B, C) the record 221 and utilize the characteristics of the direct transfer to evaluate the activity of the user of the device 102. Access or receipt of the record 221 may be triggered by automatic or user initiated communication. Automatic communications may be a predefined set of conditions that, when met, trigger the automatic downloading and storing of records 221 and/or cards 223. The predefined set of conditions may be user definable, such that the downloading and storing may automatically occur after a designated time has elapsed (e.g., every five minutes), on a specific schedule (e.g., once a day), or the like. Further, automatic communications may immediately follow a direct transfer as a result of the devices 101, 102 being presently connected to the system 140 or may immediately follow a re-connection to the systems 140. User initiated communication may be an option for the user to directly trigger the downloading and storing of available records 221 and/or cards 223. Further, the transaction module 218 may also work in conjunction with the interface module to prompt or to notify the user prior to trigger the downloading and storing of available records 221 and/or cards 223 after the predefined set of conditions are met. Regardless of whether the downloading and storing of records 221 and/or cards 223 is automatic or user initiated, the records 221 and/or cards 223 may be communicated individually or collectively, such as in a bulk communication, as defined by the predefined set of conditions.

The transaction module 218 may further utilize the records 221 and/or cards 223 to evaluate the activity of the user of the device 102, such as evaluating the characteristics stored in the records 221 and the user information and preference stored in the cards 223 to identify relevant content and services for the users of the devices 101, 102. Thus, the transaction module 218 may for example access or retrieve the records 221 in the database 220 to provide intelligent assessments of each user's activities outside of the system 140 and recommendations for what type of materials may be further sent to each user.

The transaction module 218 may include a set of executable instructions configured to provide services, such as marketing services, generating recommendations, forwarding materials, etc. That is, the transaction module 218 may evaluate the records 221 to assess each user's activities with respect to the direct transfer and provide services based on that assessment for the devices 101, 102, 103 and/or users of those devices.

Marketing services may include data-mining the characteristics of records 221 and forwarding advertisements to the user of the device 101, 102, 103 based on the data-mining, such as if the content of the direct transfer is a coupon then an advertisement related to that particular coupon may be sent to the user. Generating recommendations may include providing notifications of items that may be of interest to the user of the device 101, 102, 103, such as if music is the content of the direct transfer then a notification of a recent article regarding the music may be sent to the user as recommended reading.

Forwarding materials may include providing additional content related to the content of the direct transfer to the user of the device 101, 102, 103, such as sending coupons that are of a type that is similar to the shared coupon.

The database 220, as described above, may include various kinds of mechanisms for storing, providing, accessing, and retrieving various kinds of data, such as records 221 and cards 223.

Records 221 digitally represent individual content transfers by storing at least a subset of characteristics related to the content transfer and locally stored cards 223. A record 221 may be duplicated between the devices 101-103 and the provider device 120 as a corresponding record 221', where a prime symbol to illustrate the relation to the original record 221. Thus, characteristics may indicate user demographics, how content was transferred (e.g., NFC or Bluetooth® technologies), when content was transferred (e.g., time of day, day of the week), time and/or distance between consent and transfer, type of content shared, rights associated with the content, whether payment was associated with the content transfer, security measures during the transfer (e.g., non-secure NFC engagements), etc.

Cards 223 or "Share Content Cards" digitally represent user accounts and include configurable settings (e.g., identify users and their preferences to manage content transfers and generate records that store characteristics of direct transfers). Further, cards 223 enable the service provider to gather user traffic and behavioral data insights that can be leveraged to create target marketing strategies. Examples of configurable settings may include but are not limited to frequency of content transfers, permissions relating to content sharing (e.g., limited transactions per month or between specific devices/users), regulation on collection of data (e.g., records 221), billing services, user preferences, and/or user account settings.

Cards 223 may also be embedded with a unique identifier that is utilized by the transaction application 210 to associate operations with a particular user, such as the NFC operations above. For instance, a card 223 may enable a user through the transaction application 120 to designate filters and save preferences regarding the content sent or received via the NFC operations above. The unique identifier of the card 223 may be utilized to identify the user and/or to find and update a corresponding card 223' stored on the provider device 120. A corresponding card 223' may be a copy or duplicate of a card 223 and is herein identified by a prime symbol to illustrate its relation to the original card 223. Corresponding cards 223' like cards 223 govern marketing services, such as additional content rendered with respect to the NFC Tag operations and/or when content is delivered subsequently to NFC Share operations (e.g., when direct transfers outside the system are duplicated within the system).

Thus, one example of a card 223 may be: "John Smith's Share Content Card" that receives content only from a first list of friends, sends content when the user device is within geographic location (e.g., such as within a zip code, city, or county), and limits that number of direct transfers to 15 'taps' per month. Another example of a card 223 may be: "Jill Adam's Share Content Card" that receives content from anyone and receives only pictures and music.

In addition, FIG. 2 respectively illustrates the records 221, corresponding records 221', cards 223, and corresponding cards 223' as records 221.0 to 221.$i$, corresponding records 221.0' to 221.$i$', cards 223.0 to 221.$j$, and corresponding cards 223.0' to 221.$j$'. The notations of 'i' and 'j' indicate the plurality of records and cards stored on the database 220. Further, the records 221 and the cards 223 may be duplicated between the devices 101-103 and the provider device 120, such that an original record 221 or card 223 stored on the devices 101-103 have a matching or corresponding record 221' or card 223' stored on the provider device. Note that an original record 221 and card 223 may not necessarily be exactly the same as a corresponding record 221' and card 223' as further described below. Thus, regardless of whether the devices 101, 102 are connected to the provider device 120, the provider device 120 at any time analyze the corresponding records 221' and cards 223' to generate recommendations, prepare materials, etc. that may be provided to the devices 101, 102 at the next connection opportunity.

Figure 3:
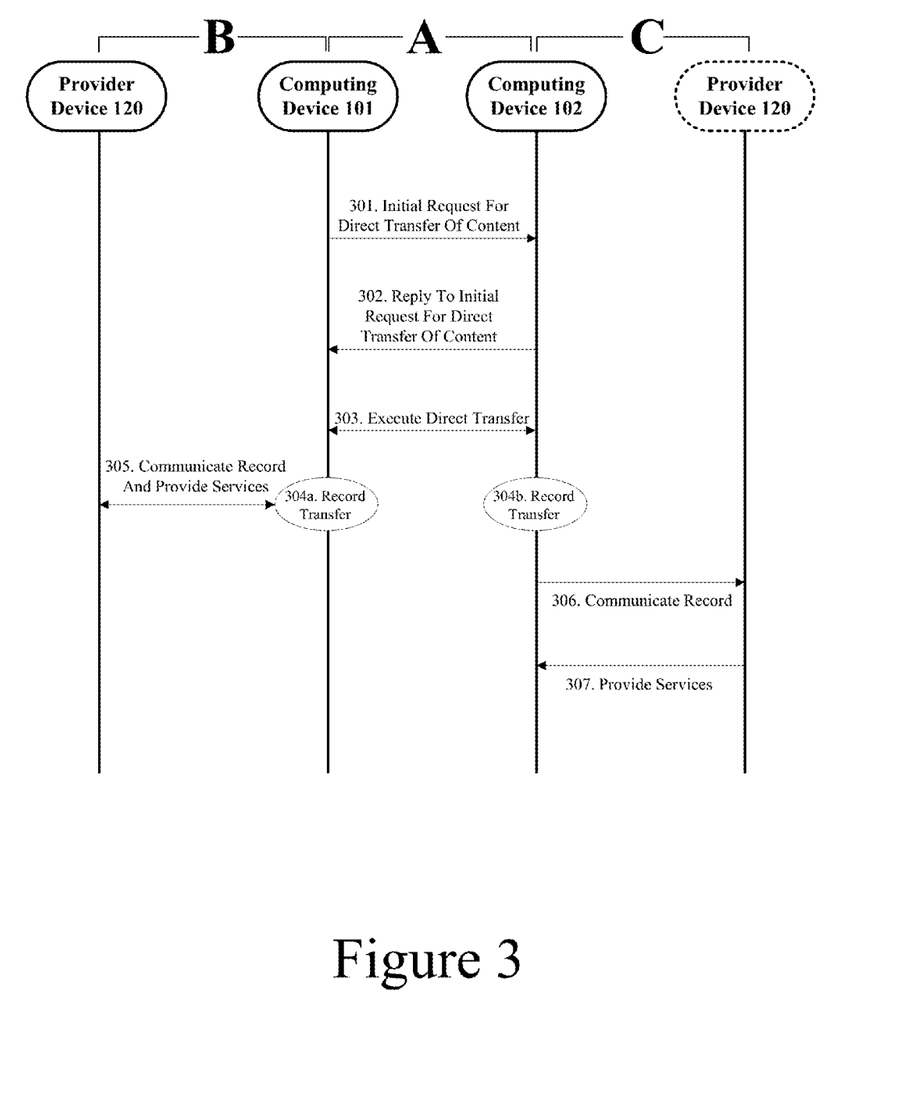
FIG. 3 illustrates exemplary communication operations regarding a direct transfer.

FIG. 3 illustrates communication operations of the direct transfer of exemplary scheme 100. The communication operations may begin in response to an initiation of a direct transfer of content by a first user via the first device 101 to a second user via the second device 102. In this regard, a first user through a first user interface 216 generated by a first transaction application 210 and displayed by a first display of the first device 101 may submit inputs that select or identify a particular content stored within the first device 101. The inputs may further indicate the desire to begin a direct transfer of that selected content. In response, the first transaction application 210 begins a first NFC task operation that prepares a first NFC chip of the first device 101 (e.g., the transceiver 144) for a direct transfer the selected content.

Next, the first transaction application 210 via the first NFC chip sends 301 an initial request for a direct transfer of the selected content (e.g., direct transfer A) to the second device 102. To receive this request, a second NFC chip of the second device 102 may be affirmatively activated by inputs supplied by the second user (e.g., these inputs may particularly initiate a second NFC task operation). Alternatively, the second device 102 may be passively activated, such that the second NFC chip of the second device 102 operates in a low power mode and waits to receive the request 301 (e.g., the second device 102 may be executing a wait stage of an NFC Tap operation as described below). In either case, once the request is received, the second device 102 via a second display may prompt a second user interface 216 generated by a second transaction application 210 that requests consent from the second user to perform the direct transfer.

When the second user inputs an indication of consent to perform the direct transfer, the second transaction application 210 via the second NFC chip of the second device sends 302 a reply to the initial request for a direct transfer of the selected content (e.g., direct transfer A).

After the consent of both users has been verified by the respective transaction modules 218 of the first and second transaction applications 210, the direct transfer of the selected content is executed 303 via an NFC Share operation between the devices 101, 102.

Once the NFC Share operation is complete, the devices 101, 102 may respectively memorialize the direct transfer of the selected content in records 221. The records 221 may further be utilized to record or update corresponding records 221' on the provider device 120. The corresponding records 221' may then be accumulated according to respective cards 223' based on the unique identifiers. Thus, regardless of whether the devices 101, 102 are connected to the provider device 120, a provider transaction application 210 of the provider device 120 may generate recommendations, prepare materials, etc. that may be provided to the devices 101, 102 at the next connection opportunity (e.g., the transaction module 218 of the provider application 210 may access or retrieve the corresponding records 221' and the respective cards 223' to assess of user activity outside of the system 140 and provide services, such as marketing services, generating recommendations, forwarding materials, etc.).

For instance, the first transaction application 210 may record 304a at least a subset of characteristics of the direct transfer within the memory 105 or in a first record 221.0 (from the perspective or role of the first device 101—e.g., whether the first device 101 is the transferor or transferee) and then immediately proceed to communicate 305 with the provider device 120 (e.g., arrow B in FIG. 1) such that a first corresponding record 221.0' is recorded on the provider device 120. Both the first record 221.0 and the first corresponding record 221.0' include the characteristics of the direct transfer and include a unique identifier for the first user, as identified by a first card 223.0. Note that the immediate communication by the first device transaction application 210 with the provider transaction application 210 may be a result of the first device 101 being presently connected to the system 140 at the time of the direct transfer. In turn, the provider transaction application 210 may evaluate the first corresponding record 221.0' in view of other corresponding records 221' that may be related to the unique identified for the first user (if these corresponding records 221' exist). Further, the provider transaction application 210 provides 305 services, such as marketing services, based the evaluation of the first corresponding record 221.0' and user preferences of the first card 223.0 or first corresponding card 223.0' (note that the communication between the first device 101 and the provider device 120 in this example is a dual-session where both devices are in simultaneous communication).

Further, the second transaction application 210 may record 304b at least a subset of the characteristics of the direct transfer within the memory 105 or in a second record 221.1 (from the perspective or role of the second device). The characteristics recorded in the second record 221.1 directly correspond to the unique identifier for the second user, as identified by a second card 223.1. Further, the second device 102 may not be connected to the system 140 at the time of the direct transfer, and thus communication of the second record 221.1 to the provider device 120 must wait for a connection 147. Once a connection 147 is established the second transaction application 210 may communicate 306 the second record 221.1 to the provider transaction application 210, such that a second corresponding record 221.1' is recorded on the provider device 120. Both the second record 221.1 and the second corresponding record 221.1' include the characteristics of the direct transfer and include a unique identifier for the second user, as identified by way of a second card 223.1. In turn, the provider transaction application 210 may evaluate the second corresponding record 221.1' in view of other corresponding records 221' that may be related to the unique identified for the second user (if these corresponding records 221' exist). Further, the provider transaction application 210 provides services 307, such as marketing services, based the evaluation of the second corresponding record 221.1' and user preferences of the second card 223.1 or a second corresponding card 223.1' (note that the communication between the second device 101 and the provider device 120 in this example is single-session where both the first and second devices 101, 102 communicate in a serial mode). In addition, although particular operation are illustrated with respect to the devices 101-102 and the dual- and single-sessions, both devices 101-102 are capable of executing either of the dual- and single-sessions as described above.

Figure 4:
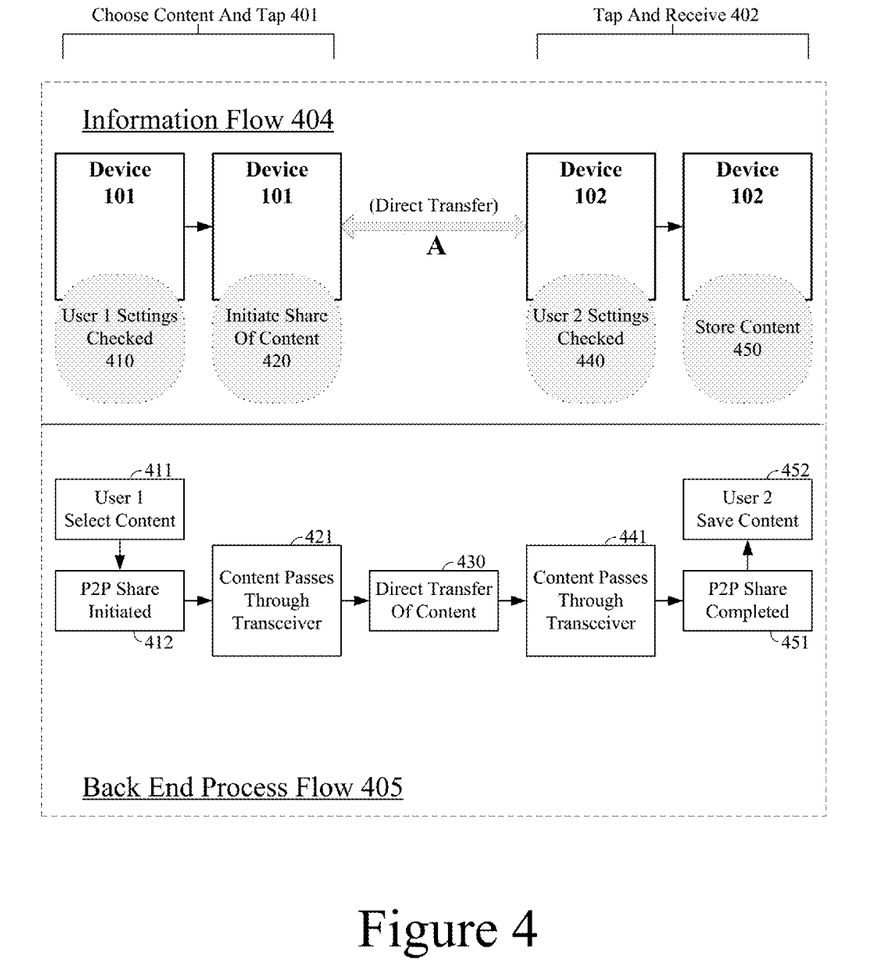
FIG. 4 illustrates an exemplary NFC Share operation.

FIG. 4 illustrates an exemplary NFC Share operation that provides a seamless transfer of content between the devices 101-103. For example, a seamless transfer of content (e.g., direct transfer) may include when a first user chooses 401 content within a first device and 'taps' the first device with a second device (e.g., move the first within an NFC range of the second device, such as physically contacting the second device with the first device). A second user reciprocates the tap 402 with the second device to receive the chosen content (e.g., verifies that a tap is authorized, such as through reciprocal movement of the second device within the NFC range of the first device or via an input indicating acknowledgement of the tap by the first device).

Further, the seamless transfer of content may be based on an exemplary information process flow 404 and an exemplary back end process flow 405. That is, the exemplary information process flow 404 and the exemplary back end process flow 405 operate such that the seamless (401-402) direct transfer may be perceived by the users (e.g., the user witnesses the movement of content without witnessing the software processing).

To support when a first user chooses 401 content within a first device and taps the first device, the exemplary information process flow 404 checks 410 user settings (e.g., user preferences stored in a card 223.0, such as the "John Smith's Share Content Card" identified above) and initiates 420 the NFC Share operation of the content. To check 410 the user settings, the transaction application 210 of the first device 101 on the back end (e.g., software processing that the user does not witness) receives an input that identifies the selection 411 of content by the first user and determines whether the direct transfer satisfies the configurable settings of the card 223.0. For example, to check 410 the user settings, the transaction application 210 of the first device 101 on the back end receives an input that identifies the selection 411 of content by the first user and verifies that the second device 102 is located within a permitted zip code and that the current direct transfer of the first device is below a permitted maximum (e.g., 15) 'taps' per month limits. If the direct transfer does not satisfy the configurable settings of the card 223.0, the transaction application 210 of the first device 101 may prevent the direct transfer and display a prompt notifying the user, e.g., that the direct transfer was not effected and of the specifics as to why on an interface of the first device 101 (so that the user can react accordingly). If the direct transfer satisfies the configurable settings of the card 223.0, the exemplary back end process flow 405 proceeds to initiate 412 an NFC task operation (e.g., perform steps to initiate a peer-to-peer share) that prepares the transaction application 210 of the first device 101, the selected content, and the transceiver 144 (e.g., a first NFC chip) of the first device 101 for the direct transfer. To initiate 420 the NFC Share operation of the content, communication (e.g., direct transfer A) is established between the first and second devices 101-102 and the selected content is passed 421 through the prepared transceiver.

Passing 421 the selected content from the first devices 101 to the second device 102 may be a multi-facet operation. In one example, an indication that a direct transfer is ready to commence may be passed to the second device 102 from the first device 101, when the devices 101-102 are within the NFC range. In this instance, the second NFC chip of the second device 102 operates in a low power mode and waits to receive the indication. The second device 102 is then passively activated by detection of the indication. Next, the direct transfer of content 430 is executed via the NFC Share operation. Alternatively, the second NFC chip of the second device 102 may be affirmatively activated by inputs supplied by the second user. In turn, the NFC connection may be activated by moving the devices 101-102 within the NFC range. Next, the direct transfer of content 430 is executed via the NFC Share operation.

To support when the second user reciprocates the tap 402 (e.g., verifies that a tap is authorized) with the second device 102 to receive the chosen content, the exemplary information process flow 404 checks 440 user settings (e.g., user preferences stored in a card 223.1, such as the "Jill Adam's Share Content Card" identified above) and stores 450 the shared content after the user settings are cleared or met. To check 440 the user settings, the transaction application 210 of the second device 102 on the back end receives 441 the selected content through the transceiver 144 (e.g., the second NFC chip) of the second device 102 and utilizes user preferences stored in the card 223.1 to verify the received content. In the case of card 223.1, for example, the selected content must be at least one picture or instance of music in order for the NFC Share operation to complete. Thus, multiple pieces of content are able to be received or transferred in a single NFC Share operation as long as the multiple pieces of content meet the user preferences stored in the card 223.

To store 450 the shared selected content, the transaction application 210 of the second device 102 on the back end proceeds to complete 451 the NFC Share operation (e.g., complete the peer-to-peer share). In this case, the transaction application 210 of the second device 102 communicates the success of the direct transfer to the transaction application 210 of the first device 101. Further, the transaction application 210 of the second device 102 saves 452 the selected content.

In addition, the first and second devices 101-102 may generate respective records 221 for the direct transfer A that detail the characteristics of the transaction and communicate those records 223 to the provider device 120, such that corresponding records 223' may be recorded and utilize for marketing services.

FIG. 5 illustrates an NFC Tap operation within a scheme 500. Further, FIG. 5 illustrates a carrier network 501 that supports the communications (e.g., arrows B1-B4) with the provider device 120. In this case, the provider device 120 stores the content while the carrier network 501 independently provides marketing services to the first device 101. Thus, while the NFC Tap operation is a one direction interaction of detecting an NFC tag that triggers a system transfer of content from the provider device 120 to the first device 101, the system transfer may include the record 221 and card 223 respective to the NFC Tap operation such that the carrier network 501 may evaluate characteristics of the system transfer. Thus, even though the carrier network 501 is a passive participant to the system transfer, the carrier network 501 may still utilize the characteristics of the system transfer to enhance the marketing services to the first device 101 since the carrier network 501 may review the record 221 and card 223 as they pass through the carrier network 501.

The NFC Tap operation may begin when a first user approaches and taps 510 an NFC tag with first device 101. In general, the NFC tag may be included into items such as advertising posters at a bus stop or a train station, and store information related to those items. Thus, when the first user approaches a poster and moves the first device 101 within an NFC range of the NFC tag, the NFC Tap operation may be a detection by the first NFC chip of the first device 101 of the distinct electrical signal of the NFC tag. Based on this detection, information stored on the NFC tag is received by a first device 101. At this time, the record 221 for this NFC Tap operation may be generated with respect to the card 223 such that characteristics of the NFC Tap operation are recorded.

Then, based on the information associated with the NFC tag, the transaction application 210 of the first device 101 communicates (e.g., arrow B1) with the provider device 120 through the carrier network 501 to execute a system transfer.

During the communication (e.g., between arrows B1 and B2) the record 221 and card 223 may be copied from the communication and evaluated by the carrier network 501. Once the communication reaches (e.g., arrow B2) the provider device 120, the provider device 120 may be instructed to search 520 for content related to the information stored on the NFC tag and contained in the communication (e.g., arrow B2).

For example, if the poster is an advertisement for an upcoming movie, the NFC tag associated with that poster may include information to receive a free download of the music score for the movie. Thus, the provider device 120 may be instructed to search 520 for a music score based on the communication from the first device 101 that is triggered by the NFC Tap operation.

The provider device 120 may further utilize the record 221 and/or card 223 to generate/update a corresponding record 221' and a corresponding card 223' based on the search for content 520 (e.g., the unique identifier of the card 223 may be utilized to identify the user and/or to find and update a corresponding card 223' stored on the provider device 120). That is, the NFC tag information may be only needed to identify the item to which the NFC tag is attached, as the identity of that item would be sufficient to search 520 for content. However, the provider device 120 may alter the content associated with the NFC tag information based on additional factors. For example, the first 50 users to tap the poster may receive a free movie voucher along with the music score, while all subsequent users may receive only the music score. Further, the corresponding record 221' and the corresponding card 223' may include information that was not initially retained in the original communication (e.g., arrows B1-B2). For example, a corresponding card 223' may include user information that was not local to the card 223, such as voucher preferences, while the original communication only includes the NFC tag information. In turn, if the voucher preferences are set to automatically refuse movie vouchers, then the movie voucher will not be received even if the user is one of the first 50 users.

Next, the provider device 120 may transfer 540 content back to the first device 101 (e.g., arrow B3), along with the corresponding record 221' and the corresponding card 223'. During communication (e.g., between arrows B3 and B4) the corresponding record 221' and the corresponding card 223' may also be stripped from the communication and evaluated by the carrier network 501.

Next, the content is received 550 by the first device 101, along with the corresponding record 221' and the corresponding card 223' (e.g., arrow B4). At this time, the first device may utilize the corresponding record 221' and the corresponding card 223' to update the local record and card 221, 223 (e.g., the most recent characteristics, user account information, and configurable settings of the corresponding record 221' and the corresponding card 223' are utilized to update older characteristics, user account information, and configurable settings of the local record and card 221, 223). Thus, the system transfer is complete.

Figure 6:
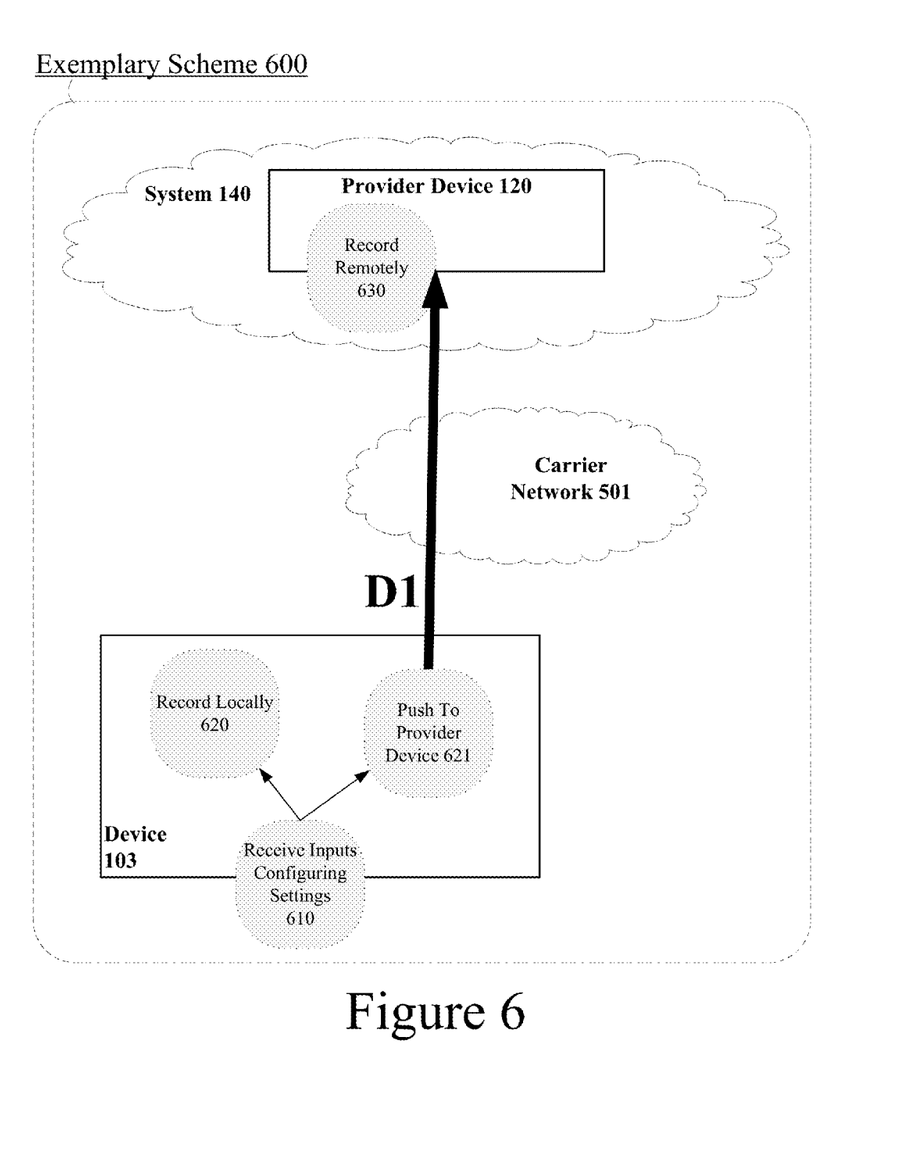
FIG. 6 illustrates communication operations of a card update operation.

FIG. 6 illustrates communication operations of a card update operation within a scheme 600. The carrier network 501 of FIG. 6 does not participate in providing marketing services. Thus, the carrier network 501 may act as a medium for transport rather than an active participant.

In FIG. 6, a third device 103 receives 610 inputs through a user interface 216 of a third transaction application 210 that indicate user configuration settings, which are utilized to update a card 223 associated with the user. These setting are then both recorded 620 locally in the card 223 by the third device 103 and pushed 621 to the provider device for storage on a corresponding card 223'. During the push to the provider device 120, the configuration settings are communicated through a carrier network 501 (e.g., arrow D1). In this case, however, the carrier network 501 does not have access to either of the card 223 or the corresponding card 223'. When the configuration settings arrive at the provider device 120, they are recorded 630 by the provider transaction application 120 in the corresponding card 223'.

In view of the above, the system and method provides direct transfers of content as described above and direct transfers may be utilized by the service provider systems to support services for users. The system and method further provides the opportunity to monetize shared content and marketing services via NFC Share and/or Tap operations as described above. The system and method also provides intelligent delivery of only relevant content transfers via NFC based on user preferences, along with a seamless content sharing experience. In turn, users may feel liberated from system transfers that require service provider systems, as they may now receive services relevant to their direct transfers.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description or Abstract below, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A method, comprising:
 receiving an input, through a user interface generated by a first application of a first device, that indicates a selection of at least one content from a plurality of contents;
 performing, by the first device, a direct transfer of the at least one content with a second device by utilizing settings stored on the first device within a card that designates filters and preferences regarding the at least one content sent or received via the direct transfer;
 identifying characteristics of the direct transfer;
 communicating at least a subset of the characteristics to a third device, the third device being configured to evaluate the subset; and
 providing services to the first device and the second device based on the evaluated subset;
 wherein the first and second devices are mobile devices; and
 wherein the third device is a provider server device.

2. The method of claim 1, wherein the card is stored on the first device, and the card digitally represents a user account.

3. The method of claim 2, wherein the card is embedded with a unique identifier that is utilized by the first application to associate a user with the direct transfer.

4. The method of claim 1, wherein the characteristics are particular to a role of the first device in the direct transfer.

5. The method of claim 1, wherein the direct transfer is performed via a local communication technology of the first device.

6. The method of claim 5, wherein the local communication technology of the first device is a near field communication connection.

7. The method of claim 1, further comprising:
 generating, by each of the first device and the second device, at least one record that includes at least the subset of the characteristics;
 storing the at least one record in respective memories of the first device and the second device; and
 communicating the at least one record from each of the first device and the second device to the third device when the first device is connected to the third device; and
 evaluating, by the third device, separately the at least one record from each of the first device and the second device.

8. The method of claim 1, wherein the services are marketing services that are tailored by the third device for the first device based on the evaluated subset.

9. A system, comprising:
 a first device, a second device, and a third device;
 the first device storing a first application, the first application being executable by a processor of the first device to provide operations comprising:
  receiving an input, through a user interface generated by the first application, that indicates a selection of at least one content from a plurality of contents;
  performing a direct transfer of the at least one content with the second device by utilizing settings stored on the first device;
  identifying characteristics of the direct transfer; and
  communicating at least a subset of the characteristics to the third device;
 the third device providing services to the first device and the second device based on at least the evaluated subset; and
 a card designating filters and preferences regarding the at least one content sent or received via the direct transfer;
 wherein the first and second devices are mobile devices; and
 wherein the third device is a provider server device.

10. The system of claim 9, wherein the settings are stored within the card, the card is stored on the first device, and the card digitally represents a user account.

11. The system of claim 10, wherein the card is embedded with a unique identifier that is utilized by the first application to associate a user with the direct transfer.

12. The system of claim 9, wherein the characteristics are particular to a role of the first device in the direct transfer.

13. The system of claim 9, wherein the direct transfer is performed via a local communication technology of the first device.

14. The system of claim 9, wherein the operations provided by the first application further comprise:

generating at least one record configured to store at least the subset of the characteristics; and communicating the at least one record to the third device when the first device is connected to the third device.

15. The system of claim 9, further comprises:

the second device storing a second application, the second application being executable by a second processor of the second device to provide operations comprising:

receiving the at least one content from the first device;

identifying a second characteristics of the direct transfer, the second characteristics being particular to a role of the second device in the direct transfer; and communicating at least a subset of the second characteristics to the third device.

16. The system of claim 9, further comprises:

the third device storing a third application, the third application being executable by a third processor of the third device to provide operations comprising:

evaluating the subset.

17. The system of claim 16, wherein the operations provided by the third application further comprise:

tailoring the services for the first device based on the evaluated subset.

18. A system, comprising:

a first device storing a first application, the first application being executable by a processor of the first device to provide operations comprising:

receiving an input through a user interface generated by the first application that indicates a selection of at least one content from a plurality of contents;

performing a direct transfer of the at least one content with a second device by utilizing settings stored on the first device;

identifying characteristics of the direct transfers;

communicating at least a subset of the characteristics to a third device a card designating filters and preferences regarding the at least one content sent or received via the direct transfer;

the second device storing a second application, the second application being executable by a second processor of the second device to provide operations comprising:

receiving the at least one content from the first device;

the third device storing a third application, the third application being executable by a third processor of the third device to provide operations comprising:

evaluating the subset; and providing services to the first device and the second device based on the evaluated subset;

wherein the first and second devices are mobile devices; and wherein the third device is a provider server device.

* * * * *